US006809732B2

(12) United States Patent
Zatz et al.

(10) Patent No.: US 6,809,732 B2
(45) Date of Patent: Oct. 26, 2004

(54) METHOD AND APPARATUS FOR GENERATION OF PROGRAMMABLE SHADER CONFIGURATION INFORMATION FROM STATE-BASED CONTROL INFORMATION AND PROGRAM INSTRUCTIONS

(75) Inventors: Harold Robert Feldman Zatz, Palo Alto, CA (US); David C. Tannenbaum, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 136 days.

(21) Appl. No.: 10/318,560

(22) Filed: Dec. 13, 2002

(65) Prior Publication Data

US 2004/0012597 A1 Jan. 22, 2004

Related U.S. Application Data

(60) Provisional application No. 60/397,087, filed on Jul. 18, 2002.

(51) Int. Cl.[7] .............................................. G06F 15/16
(52) U.S. Cl. .................. 345/503; 345/426; 345/506; 345/520; 345/522; 717/136; 719/320; 719/321
(58) Field of Search ................................. 345/418, 426, 345/503, 506, 520, 522; 712/32, 34, 37; 717/114, 136, 140; 719/321, 322, 323, 328, 320

(56) References Cited

U.S. PATENT DOCUMENTS

| | | | |
|---|---|---|---|
| 6,198,488 B1 * | 3/2001 | Lindholm et al. | 345/426 |
| 6,578,197 B1 * | 6/2003 | Peercy et al. | 717/143 |
| 6,693,639 B2 * | 2/2004 | Duluk et al. | 345/506 |
| 2002/0003541 A1 * | 1/2002 | Boyd et al. | 345/501 |
| 2003/0020741 A1 * | 1/2003 | Boland et al. | 345/700 |
| 2003/0030643 A1 * | 2/2003 | Taylor et al. | 345/531 |
| 2003/0067473 A1 * | 4/2003 | Taylor et al. | 345/561 |
| 2003/0217112 A1 * | 11/2003 | Emmot | 709/208 |
| 2004/0003370 A1 * | 1/2004 | Schnek et al. | 717/100 |

OTHER PUBLICATIONS

N. Carr, J. Hall, and J. Hart. The Ray Engine. In Graphics Hardware (2002), The Eurographics Association 2002, pp. 1–10.*

W. Mark and K. Proudfoot. Compiling to a VLIW Fragment Pipeline. In Proceedings of 2001 SIGGRAPH/Eurographics Workshop on Graphics Hardware, p. 47–55.*

E. Lindholm, M. Kilgard, and H. Moreton. A User–Programmable Vertex Engine. In Proceedings of the 28th annual conference on Computer graphics and interactive techniques, Aug. 2001, p. 149–159.*

K. Proudfoot, W. Mark, S. Tzvetkov, and P. Hanrahan. A Real–Time Procedural Shading System for Programmable Graphics Hardware. In Proceedings of the 28th annual conference on Computer graphics and interactive techniques, Aug. 2001, p. 159–170.*

* cited by examiner

Primary Examiner—Ulka J. Chauhan
(74) Attorney, Agent, or Firm—Moser, Patterson & Sheridon LLP

(57) ABSTRACT

A graphics subsystem having a programmable shader controllable by both state-based control information, such as DirectX 8 control information, and program instructions, such as DirectX 9 shader program instructions. The programmable shader translates state-based control information received from a host computer into native control information. The programmable shader translates into native control information program instructions fetched from memory locations identified by a received memory reference and program instructions received from the graphics subsystem. Native control information configures computation units of the programmable shader. The programmable shader optimizes the generated native control information by combining certain operations. The graphics subsystem detects memory references sent from the host computer and prefetches program instructions for transmission to the programmable shader. Native control information from multiple control sources is concurrently used in the programmable shader.

37 Claims, 7 Drawing Sheets

METHOD AND APPARATUS FOR GENERATION OF PROGRAMMABLE SHADER CONFIGURATION INFORMATION FROM STATE-BASED CONTROL INFORMATION AND PROGRAM INSTRUCTIONS

CROSS REFERENCE TO RELATED APPLICATIONS

This application claims the benefit of Provisional Patent Application Ser. No. 60/397,087, filed on Jul. 18, 2002, entitled "Shader System and Method," and incorporated by reference herein.

BACKGROUND

1. Field of the Invention

The invention is in the field of computer graphics processor architecture and processing.

2. Description of Related Art

As is known by those skilled in the art of computer graphics, a computer typically comprises a general purpose processor that executes application program instructions and generates output data that is to be visually displayed on a monitor coupled to the computer. When performing computer graphics functions, the output data generated by the general purpose processor typically consists of a high level description of a scene for display, and other high level information such as from where the scene is to be viewed, what textures should be applied to different primitives in the scene, and where lights are located in the scene. However, the typical monitor is a simple device for accepting and outputting color information on a pixel-by-pixel basis; the typical monitor cannot interpret the output data from the application. Therefore, the output data must be processed by a graphics processor and translated into pixel color information for transmission to and display by the monitor.

A modern graphics processor frequently includes a fragment processor, also referred to as a pixel shader or pixel color processor. The fragment processor is primarily responsible for determining a final color for each fragment or pixel for which it receives information. For instance, such fragment information can include specular and diffuse lighting parameters, and texture information. However, in addition to fragment information, the fragment processor requires control information that specifies how the fragment processor is to process the fragment information to arrive at a final pixel color. The content of the control information depends on the type of fragment processor in use; one fragment processor can have a different number of computation units or computation units of a different type than another fragment processor, and would therefore require different control information or a different format of control information.

Graphics oriented Application Programming Interfaces (APIs), such as DirectX 8™ and OpenGL™, abstract these differences from application developers by providing a common set of commands that can be used to configure a variety of graphics processors. For instance, a version of DirectX 8 has 127 different commands available to application developers for control of a fragment processor in a graphics processor. An application developer can then arrange a sequence of commands chosen from these 127 commands, and present the sequence of commands to a driver written for the graphics processor in use. The driver converts the sequence of commands into a number of bits of control information that can directly configure the computation units of the graphics processor in use. Thus, the control information generated by the driver is specific to the architecture of the fragment processor in use and, therefore, the control information cannot be used to directly configure another type of fragment processor. This process of an application or a driver controlling a fragment processor by directly configuring its computation units with control information is known as state-based control of a fragment processor, and the information generated by the driver is known as state-based control information because the state (configuration) of computation units in the fragment processor is directly controlled by hardware or software external to the graphics processor. The set of control information active at a given time in a graphics processor is known in the art as "pipeline state". Although the above-described method for controlling a fragment processor advanced the art of real-time creation of more realistic computer graphics, several limitations of state-based control methods are now evident.

One limitation is that the range of commands available for use by an application developer is inadequate for creating cutting edge computer graphics. Therefore, some application developers directly write state-based control information (created by the driver in the above example) because desired effects cannot be achieved using the commands available. Writing state-based control information is tedious, and the resulting state-based control information is likely to have errors. The resulting state-based control information is not portable to other fragment processors because the state-based control information comprehends characteristics of the fragment processor, such as the type, number, and arrangement of the fragment processor's resources.

An alternative approach is to provide application developers with a programmable fragment processor, which is programmed (controlled) by a shader program having a number of program instructions. Typically, for generating sophisticated graphics, controlling a fragment processor with program instructions is easier for an application developer than controlling a fragment processor with state-based control information because program instructions can be represented in a higher level programming language, and program instructions allow a greater range of operations than state-based control logic. Thus, a programmable fragment processor remedies some of the deficiencies of a state-based control fragment processor.

However, controlling a fragment processor with either program instructions or state-based control information still results in limitations. One limitation is that features of a newer fragment processor may go unused by an application written to use control information of a format compatible with an older fragment processor. Also, a programmer frequently develops a familiarity with a certain format of control information, and therefore has a preference to use that format of control information, rather than another format, when writing applications. Therefore, there is a need for a fragment processor that can use a variety of control information formats for controlling its computation units to process data.

SUMMARY

Embodiments of the invention receive control information in a plurality of formats and convert the control information into a native control format for controlling a programmable shader. In one embodiment, the invention comprises a state-based control translator for translating state-based control information into one or more codewords that natively control a programmable shader, and a program instruction translator for translating a program instruction into one or more codewords that natively control the programmable shader. Another embodiment comprises a programmable shader and a controller for detecting a start of a shader program and fetching one or more program instructions of the shader program, which are transmitted to the programmable shader. The programmable shader can begin to execute the program instructions fetched by the controller while the programmable shader fetches and translates other program instructions. Embodiments can use a memory register to store either state-based control information, if the programmable shader is to be controlled by state-based control information, or a program memory location reference identifying a memory location where one or more program instructions are stored, if the programmable shader is to be controlled by program instructions.

In one embodiment of the invention, a programmable shader for a graphics subsystem comprises a state-based control translator coupled to a data path, and configured to translate state-based control information into native control information and output the native control information to the data path. The programmer shader further comprises a program instruction translator coupled to the data path and configured to translate a program instruction into native control information and output the native control information to the data path, and a computation unit coupled to the data path to receive the native control information for configuration of the computation unit.

In another embodiment of the invention, a computing system, for processing and displaying graphical information, comprises a host computer, which comprises a host memory for storing a first program executable by the host computer to create state-based control information, and a second program executable by the host computer to create a program memory location reference. The computing system further comprises a system interface and a graphics subsystem for processing the graphical information. The graphics subsystem comprises a graphics interface coupled to the system interface for receiving the state-based control information and the program memory location reference, a local memory, and a programmable shader coupled to the interface. The programmable shader comprises a state-based control translator coupled to a data path, and configured to translate state-based control information into native control information and output the native control information to the data path. The programmer shader also comprises a program instruction translator coupled to the data path and configured to retrieve a program instruction from a memory using the program memory location reference, translate the program instruction into native control information, and output the native control information to the data path, and a computation unit coupled to the data path to receive the native control information. The computer system further comprises a display coupled to the graphics subsystem for displaying the processed graphical information.

In yet another embodiment of the invention, a graphics subsystem for processing graphical information comprises an interface coupled to receive, from a host computer, statebased control information and a program memory location reference, and further comprises a controller coupled to the interface and configured to detect the program memory location reference received by the interface and to fetch a program instruction referenced by the detected program memory location reference. The graphics subsystem also comprises a programmable shader for processing the graphical information, the programmable shader is coupled to the interface, and comprises a state-based control translator coupled to a data path and configured to translate the state-based control information into native control information and to output the native control information to the data path, a program instruction translator coupled to the data path and configured to translate the fetched program instruction into native control information and to output the native control information to the data path. The programmable shader also comprises a computation unit coupled to the data path to receive the native control information.

In still another embodiment of the invention, a programmable shader for a graphics subsystem comprises a state-based control translator coupled to a data path and configured to translate state-based control information into first native control information, and output the first native control information to the data path. The programmable shader also comprises a program instruction translator coupled to the data path, and configured to translate a program instruction into second native control information and output the second native control information to the data path. The programmable shader also comprises a first computation unit coupled to the data path to receive the first native control information and a second computation unit coupled to the data path to receive the second native control information.

In one embodiment of the invention, a method for generating native control information for controlling a programmable shader comprises the steps of determining whether the programmable shader is to be controlled by state-based control information or program instructions, receiving in a graphics subsystem state-based control information, and translating the state-based control information into native control information, if the programmable shader is to be controlled by state-based control information. If the programmable shader is to be controlled by program instructions, the method comprises receiving in a graphics subsystem a program memory location reference, fetching one or more program instructions from a memory location referenced by the program memory location reference and translating the one or more program instructions into native control information.

In another embodiment of the invention, a method for transferring control information to a programmable shader comprises receiving a control source indication specifying that the programmable shader is to be controlled by program instructions, wherein the control source indication can specify either that the programmable shader is to be controlled by state-based control information or program instructions. The method determines a memory address where a program instruction of the shader program is stored, retrieves contents of the memory address, identifies one or more program instructions in the retrieved contents, and outputs for receipt by the programmable shader the one or more program instructions.

In yet another embodiment of the invention, a method for generating native control information for controlling computation units of a programmable shader comprises receiving, in a graphics subsystem, state-based control information for control of a first computation unit and translating the state-based control information into native control information. The method also receives in the graphics subsystem a program memory location reference for identifying a memory location storing a program instruction for control of a second computation unit, fetches the program instruction, and translates the program instruction into native control information.

In yet still another embodiment of the invention, a control translator, for use in a programmable shader having a plurality of computation units for processing graphical information, comprises a codeword generator configured to input control information, wherein the control information is either state-based control information or a program instruction, and to translate the control information into native control information consisting of one or more codewords, each codeword specifying an operational configuration for one of the plurality of computation units. The control translator further comprises a sequencer configured to input the native control information and arrange the native control information in a pre-determined format compatible with at least one of the plurality of computation units.

The invention can also be embodied by a machine readable medium having embodied thereon a program, the program being executable by a machine to perform a method for generating native control information for a programmable shader. The method comprises the steps of determining whether an application uses state-based control information or program instructions for describing operations that the programmable shader is to perform on data, receiving state-based control information and translating the state-based control information into native control information, if the application uses state-based control information, and receiving one or more program instructions and translating the one or more program instructions into native control information, if the application uses program instructions.

The invention can also be embodied by a graphics subsystem comprising a means for determining a final pixel color, the means controllable by native control information, a means for translating state-based control information into the native control information, and a means for translating program instructions into the native control information.

DESCRIPTION OF THE INVENTION

The invention involves systems and methods for translating graphics processor control information from a plurality of sources into a native control format for configuring a particular graphics processor or a portion thereof. An embodiment translates state-based control and program instructions into one or more codewords that can be used to directly configure computation units of a programmable shader. In order to illustrate embodiments of the invention, an exemplary graphics processor having an exemplary programmable shader is illustrated and described. Embodiments of the invention are shown and described using the exemplary graphics processor and programmable shader.

Figure 1:
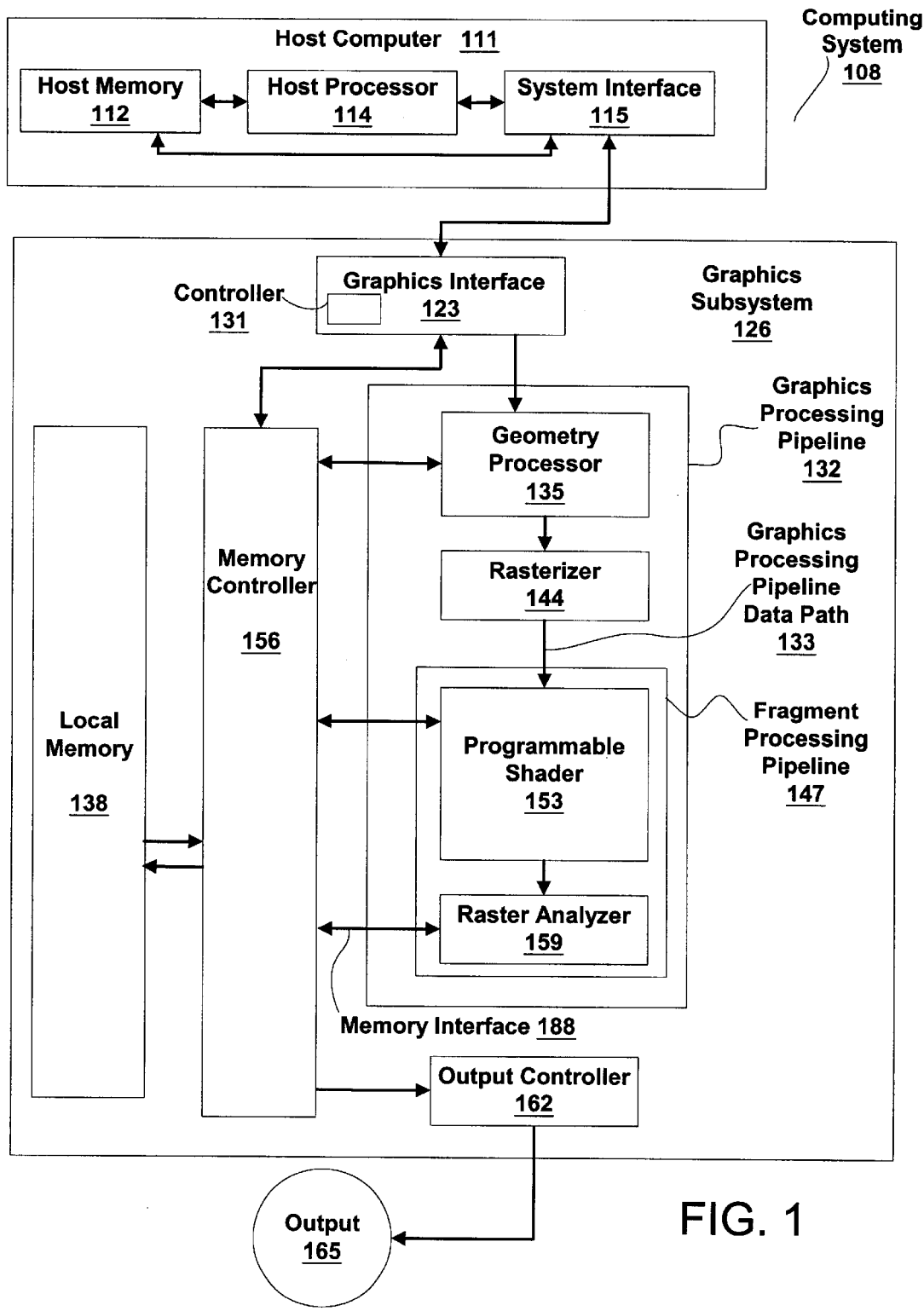
FIG. 1 is a block diagram illustrating a computing system wherein embodiments of the invention can be used.

FIG. 1 is an illustration of a Computing System generally designated 108 and including a Host Computer 111 and a Graphics Subsystem 126. Computing System 108 can be a personal computer, server, laptop computer, game console, cellular telephone, computer-based simulator, or the like. Host Computer 111 includes Host Processor 114, which may include a system memory controller to interface directly to Host Memory 112, or may communicate with Host Memory 112 through a System Interface 115. System Interface 115 may be an I/O (input/output) interface or a bridge device including the system memory controller to interface directly to Host Memory 112. Examples of System Interface 115 known in the art include Intel (R) Northbridge and Intel (R) Southbridge. In many instances Host Computer 111 loads a plurality of applications into Host Memory 112 and executes instructions from the plurality of applications in a multi-threading and/or multi-tasking environment. Each of the plurality of applications typically generates data used to generate an image for display to a user of Computer System 108. Host Computer 111 communicates the data used to generate an image for display to Graphics Subsystem 126 via a Graphics Interface 123, which has a Controller 131. Data received at Graphics Interface 123 can be processed by Controller 131, passed to a Geometry Processor 135 and written to a Local Memory 138 through Memory Controller 156. In addition to the data used to generate an image for display, Host Computer 111 communicates control information (e.g., state-based control information) that defines what operations Graphics Subsystem 126 is to perform on the data used to generate an image for display. More generally, both control information and data can be read from and written to any combination of Local Memory 138 and Host Memory 112. When a portion of Host Memory 112 stores program instructions and/or data for use by Graphics Subsystem 126, that portion of Host Memory 112 can be uncached (and/or marked as being uncachable) to enhance Graphics Subsystem's 126 access to those program instructions and/or data.

The control information transmitted by Host Computer 111 to Graphics Subsystem 126 varies depending on the type of control information generated by an application (or a driver) executing on Host Computer 111. In an embodiment, the control information is either state-based control information or a Program Memory Location Reference (PMLR). A PMLR identifies a location in a memory where one or more program instructions are stored. Typically, the one or more program instructions are part of a shader program written to accomplish a certain shading effect, and the PMLR identifies a location in the memory storing a first program instruction of the shader program. In an embodiment, the one or more program instructions are DirectX 9 shader program instructions. Although the term control information refers to both state-based control information and a PMLR, there is a distinction between these two types of control information. The state-based control information defines operations that Graphics Subsystem 126 is to perform on the data used to generate an image for display; in contrast, the PMLR is a reference to one or more memory locations storing one or more program instructions that define operations that Graphics Subsystem 126 is to perform on the data used to generate an image for display. In some embodiments, Host Computer 111 can transmit one or more program instructions in addition to a PMLR identifying memory locations storing program instructions.

In some embodiments, multiple units of Graphics Subsystem 126 (e.g., Geometry Processor 135 and Programmable Shader 153) can be controlled by control information from the application (or driver) executing on Host Computer 111. In an embodiment, an application generates either state-based control information or a PMLR, and Graphics Interface 123 determines for which unit of Graphics Subsystem 126 the control information is intended. Graphics Interface 123 transmits the control information to the destination (e.g., Programmable Shader 153) through a Graphics Processing Pipeline 132, which couples Programmable Shader 153 and Graphics Interface 123 through intermediate units, such as Geometry Processor 135.

Figure 2:
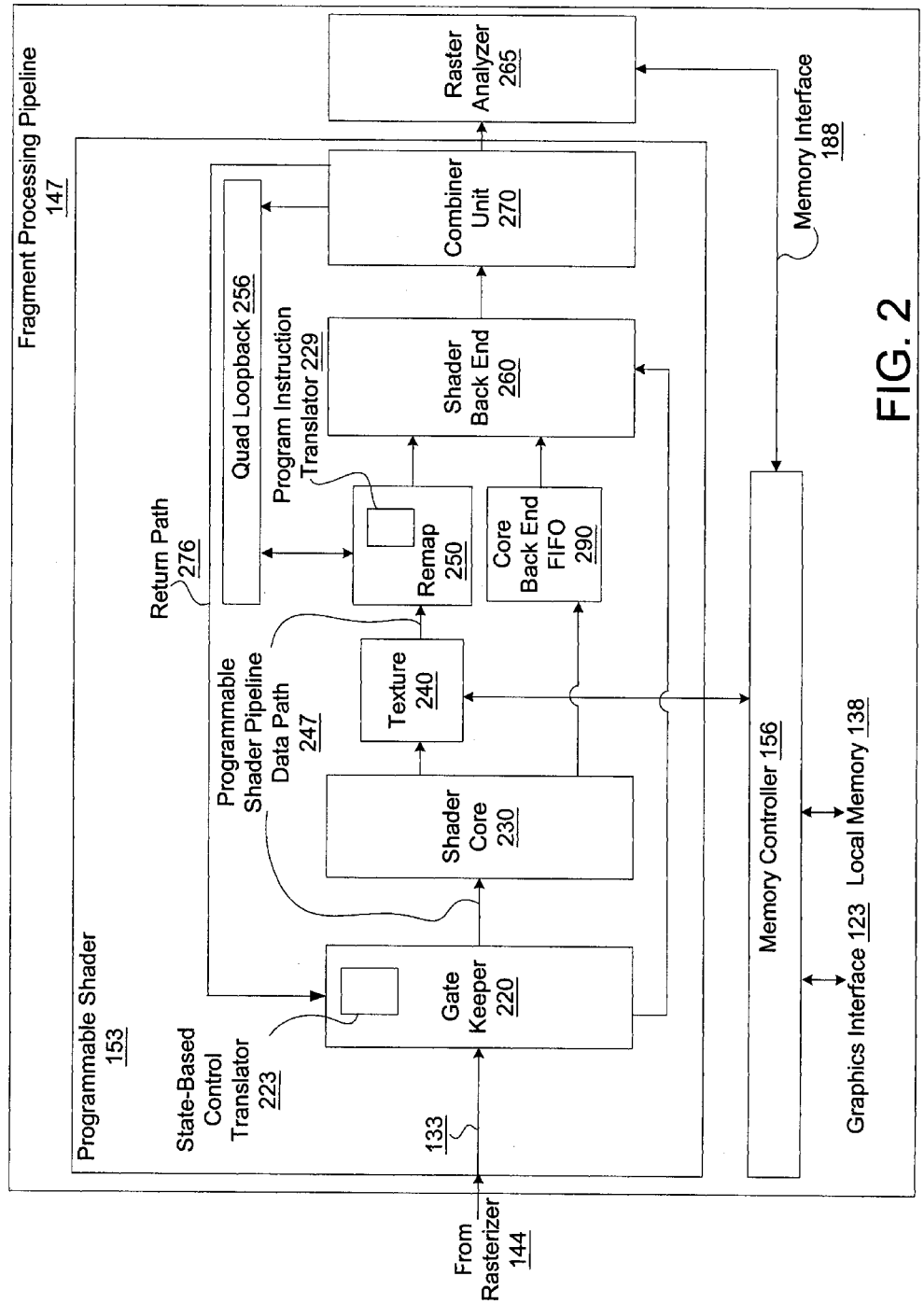
FIG. 2 is a block diagram of the Programmable Shader of FIG. 1.

The Graphics Processing Pipeline 132 transmits control information through the Graphics Processing Pipeline Data Path 133 using one or more data structures, where each data structure has an identification header that indicates for which unit the information in the data structure is intended (e.g., Programmable Shader 153). These data structures, herein referred to as state bundles, can be used to transmit other information through the Graphics Processing Pipeline 132 as well. Units of Graphics Processing Pipeline 132 (e.g., Programmable Shader 153), and computation units within those units (i.e., the computation units in Programmable Shader 153 as illustrated in FIG. 2) check the identification headers of the state bundles to determine whether a state bundle is intended for receipt by a particular unit or computation unit within a unit.

In addition to receiving and forwarding the control information received from System Interface 115, Graphics Interface 123, using Controller 131, generates a control source indication for specifying which type of control information will be used to control units of Graphics Subsystem 126. In some embodiments, the same type of control information controls the entire Graphics Subsystem 126, so that the control source indication need only differentiate between each type of control information supported by Graphics Subsystem 126. For example, the control source indication, in some embodiments, differentiates between control by state-based control information and program instructions. In an exemplary embodiment, Controller 131 broadcasts the control source indication to units of Graphics Subsystem 126 by changing the signal level of a control line connecting the units to Controller 131. Alternatively, the control source indication can be transmitted to units of Graphics Processing Pipeline 132 using state bundles, as previously described in regards to control information transmission. Units of Graphics Subsystem 126 (and optionally computation units in those units) use the control source indication for determining whether each will be controlled by state-based control information or program instructions.

In embodiments where more than one type of control information can be used in Graphics Subsystem 126 at the same time, the control source indication includes other information for identifying the unit or units to which the indication is to apply. Since a control source indication may apply to only one unit, multiple control source indications can be generated in these embodiments. In embodiments where the control source indication is broadcast, one or more selection lines are routed with the control line so that Controller 131 can select the units intended to receive the control source indication. In embodiments where the control source indication is transmitted through Graphics Processing Pipeline 132 in state bundles, the identification headers previously discussed advantageously serve to identify for which unit or units the control source indication is intended. However, further identification information can be included in embodiments.

Turning to the concept of translation of control information, the following describes the operation of an embodiment of Graphics Subsystem 126 and particularly the operation of Programmable Shader 153 after either Controller 131 has broadcast a control source indication or appropriate units have received a control source indication via Graphics Processing Pipeline 132, as described above. If Programmable Shader 153 has received a control source indication that it is to be controlled by the received state-based control information and then receives state-based control information, Programmable Shader 153 translates the control information into a native control format that can be used to directly configure computation units in Programmable Shader 153 to perform one or more operations on fragment data. If Programmable Shader 153 has instead received a control source indication indicating that it is to be controlled by program instructions, and then receives a PMLR, Programmable Shader 153 fetches one or more program instructions (and optionally other program instructions) from memory locations (e.g., within Local Memory 138), specified by the PMLR. Programmable Shader 153 then translates the fetched program instructions into the native control format.

Other embodiments of Graphics Subsystem 126 and Programmable Shader 153 may operate differently than described above. For instance, an embodiment of Programmable Shader 153 translates both state-based control information and program instructions for concurrent control of different computation units of Programmable Shader 153, as described further herein.

In an embodiment, the native control format comprises a collection of codewords, where each codeword specifies an operation, such as addition or multiplication, and optionally other configuration information such as operand and result precision, constants, condition codes, source and destination registers, and the like. A codeword can be used to directly configure a computation unit of Programmable Shader 153. To translate state-based control information or a program instruction into the native control format, Programmable Shader 153 chooses one or more codewords from the collection of codewords of the native control format. Together, the chosen one or more codewords specify the operation or operations indicated either by the state-based control information received by Programmable Shader 153 or by the program instruction. For instance, the control information received by Programmable Shader 153 can be one of the operations available in DirectX 8, such as a texture operation. In many embodiments of the invention, Programmable Shader 153 translates only those DirectX 8 operations that the Programmable Shader 153 is responsible for executing, such as the texture operation described above. The texture operation can be translated by Programmable Shader 153 into several constituent steps, such as finding the object space location of the fragment to texture, determining the texture coordinate to apply to the fragment, applying the texel coordinate to the fragment, and modifying or blending a resulting color value. Each of the constituent steps can be represented by a codeword or codewords chosen from the collection of codewords. The codewords chosen to represent the texture operation depend on the architecture of the Programmable Shader 153 and therefore one codeword can represent more than one constituent step and one constituent step can be represented by a plurality of codewords.

Other embodiments implement optimizations that generate more efficient native control information representations of received control information. In an embodiment, Programmable Shader 153 determines whether codewords that describe the operations represented by two or more program instructions can be combined into fewer codewords. For instance, Shader Core 230 is capable of executing two simple texture operations at one time. Thus, if two program instructions each specify a simple texture operation, codewords derived from each of these program instructions can be combined into one codeword representation for execution on Shader Core 230.

Returning to the general organization of Graphics Subsystem 126, Graphics Processing Pipeline 132 includes, among other units, Geometry Processor 135 and a Fragment Processing Pipeline 147. For convenience of illustration, the physical interconnection between units of the Graphics Processing Pipeline 132 is referred to herein as the Graphics Processing Pipeline Data Path 133. As those skilled in the art will recognize, Graphics Processing Pipeline 132 can have a number of physical data paths for interconnecting units. Geometry Processor 135 and Fragment Processing Pipeline 147 each contain one or more computation units to perform a variety of specialized functions that can include table lookups, scalar and vector addition, multiplication, division, coordinate-system mapping, calculation of vector normals, tessellation, calculation of derivatives, interpolation, and the like. Both Geometry Processor 135 and Fragment Processing Pipeline 147 are each optionally configured to recirculate data and/or other information so that data can be processed in multiple passes through each unit's respective computation units. In other embodiments, Fragment Processing Pipeline 147 is optionally configured to recirculate data so that data can be processed in multiple passes through the entire Graphics Processing Pipeline 132.

In typical operation Geometry Processor 135 performs vector floating-point operations or other processing operations on data received through Graphics Interface 123 or from Memory Controller 156. Processed data is passed from Geometry Processor 135 to a Rasterizer 144. In a typical implementation Rasterizer 144 performs scan conversion and outputs fragment, pixel, or sample data to Fragment Processing Pipeline 147, which operates on this fragment, pixel, or sample output data. As used herein, the term fragment can be used to refer to any attribute or attributes of a pixel, vertex, group of pixels, samples, or the like.

Fragment Processing Pipeline 147 contains Programmable Shader 153, which is responsible for computing a final color value for each fragment input to Fragment Processing Pipeline 147. To compute a final color value, computation units in Programmable Shader 153 perform operations specified by the native control format. Since codewords of the native control format can specify general purpose operations, such as addition, multiplication, and the like, computation units in Programmable Shader 153 can also be configured to perform other operations on data besides those operations required for calculating final fragment color.

Programmable Shader 153 can process fragments in multiple passes through its computation units. If controlled by state-based control information, Programmable Shader 153 performs the operations specified by the state-based control information that was last received and translated into one or more codewords. In contrast, if controlled by program instructions, Programmable Shader 153 can fetch other program instructions and translate those fetched program instructions into other codewords for use in configuring computation units of Programmable Shader 153.

For instance, Programmable Shader 153 may receive a PMLR, fetch two program instructions from a memory location determined by the PMLR, translate the two program instructions into one or more codewords, increment the PMLR, configure its computation units using the one or more codewords, and process fragment data. The Programmable Shader 153 may fetch two other program instructions from a memory location determined by the incremented PMLR, translate the two other program instructions into other codewords, increment the PMLR, reconfigure its computation units using the other codewords, and process the same fragment data again in its reconfigured computation units. Thus, if controlled by program instructions, Programmable Shader 153 can implement shader programs of various lengths without further interaction with Host Computer 111. In contrast, if controlled by state-based control information, Programmable Shader 153 remains configured to perform the same operations until receiving new state-based control information from Host Computer 111.

Data processed by Programmable Shader 153 is passed to a Raster Analyzer 159. Raster Analyzer 159 includes a Memory Interface 188 to Memory Controller 156 through which Raster Analyzer 159 reads data from and writes data to Local Memory 138, including the fragment data processed by Programmable Shader 153.

When processing is completed, Graphics Subsystem 126 outputs data through Output Controller 162 to an Output 165. Output 165 can be a display device, network, electronic control system, other Computing System 108, other Graphics Subsystem 126, or the like. Controller 162 is configured to deliver data in a format compatible with the type of Output 165 to which it is coupled.

FIG. 2 further illustrates an exemplary Programmable Shader 153. Programmable Shader 153 comprises configurable computation units, units that synchronize and/or regulate the flow of data in Programmable Shader 153, and units that obtain, generate, or receive data and control information. Units in Programmable Shader 153 can be categorized in more than one of the before-mentioned categories. For instance, a Gate Keeper 220 regulates the flow of data in Programmable Shader 153 and also functions as a pipeline interface for Programmable Shader 153 by receiving control information, and other information from Graphics Processing Pipeline Data Path 133.

One configurable computation unit is Shader Core 230, which is capable of executing any operation specified by any codeword from the native control format, including all floating-point precision operations. Another configurable computation unit is Combiner Unit 270, which is capable of executing operations specified by a portion of the codewords from the native control format. Other embodiments can have computation units having different and/or additional functionalities.

Gate Keeper 220 is coupled to receive input from a Rasterizer 144 and to output to Shader Core 230. As its name suggests, Gate Keeper 220 regulates the entry of data into the Programmable Shader Pipeline Data Path 247 from both Rasterizer 144 and Return Path 276. Gate Keeper 220 interfaces Programmable Shader 153 with Graphics Processing Pipeline Data Path 133. In embodiments, Gate Keeper 220 also determines when codewords obtained from program instructions of a new shader program begin to execute on Programmable Shader 153, as explained further herein.

Programmable Shader Pipeline Data Path 247 is a data path connecting computation units of Programmable Shader 153, and is coupled to one or more registers, where at least one register is coupled to logic of each computation unit. For instance, a register is coupled to Programmable Shader Pipeline Data Path 247 and logic of Gate Keeper 220. The register described above receives data from Programmable Shader Pipeline Data Path 247 and stores the data while the data is read, processed, and/or copied by Gate Keeper 220. The register can also receive data for output from Gate Keeper 220 and transmit that data for output onto Programmable Shader Pipeline Data Path 247. Data stored in the register coupled to Gate Keeper 220 can be transmitted to a register in Shader Core 230, where the data is read, processed, and/or copied by Shader Core 230. After this reading, processing, and/or copying is completed the data is transmitted to the next computation unit (e.g., Texture 240). For purposes of illustration herein, a register coupled to logic of a computation unit is considered to be in the computation unit.

Shader Core 230 is coupled to Texture 240 by Programmable Shader Pipeline Data Path 247 and issues one or more memory fetch requests to Texture 240. A memory fetch request can be for retrieving data such as textures, program instructions, or other information. Texture 240 receives a memory fetch request and initiates the fetching process with Memory Controller 156, which determines the physical location of a memory location (or locations) referenced by the memory fetch request. In embodiments, Shader Core 230 can issue memory fetch requests for information stored in Local Memory 138 and in Host Memory 112. Texture 240 subsequently receives the data stored in the memory addresses specified in the memory requests issued by Shader Core 230 and outputs the data to Remap 250, which is coupled to Shader Back End 260, and to Quad Loopback 256. Remap 250 reads loopback data from Quad Loopback 256 and receives texture information and program instructions from Texture 240. Remap arranges the loopback data, texture information and program instructions and outputs the arranged data to Shader Back End 260, which can perform graphics calculations, such as interpolation and clipping. Shader Back End 260 is also coupled to Core Back End FIFO 290, to Combiner Unit 270, and to Gate Keeper 220. Shader Back End 260 receives and synchronizes data from Gate Keeper 220, Core Back End FIFO 290, and Remap 250. In addition to performing the calculations previously described, Combiner Unit 270 outputs data to one or more of the following: Quad Loopback 256, Return Path 276, and Raster Analyzer 265.

As described herein, Programmable Shader 153 can process data in multiple passes through its computation units. One way is by outputting data from Combiner Unit 270 to Return Path 276. In this way, Data output to Return Path 276 returns to Gate Keeper 220, and proceeds again through Programmable Shader 153 for further processing.

In exemplary operation, Programmable Shader 153 first receives a control source indication. If the control source indication specifies that Programmable Shader 153 is to be controlled by state-based control information, Programmable Shader 153 next receives the state-based control information. Alternatively, if the control source indication specifies that the Programmable Shader 153 is to be controlled by program instructions fetched from memory, the Programmable Shader 153 next receives a PMLR, and Programmable Shader 153 fetches one or more program instructions from memory locations determined by the PMLR. Thus, either the state-based control information is, or the program instructions are, translated into the native control format and used to configure Shader Core 230 and/or Combiner Unit 270 for executing operations specified by the native control information. In an embodiment, Programmable Shader 153 contains a State-Based Control Translator 223 for translating state-based control information into the native control format and a Program Instruction Translator 229 for translating program instructions into the native control format, as described further herein.

After one or more codewords of the native control format have been selected from the collection of codewords, the one or more codewords are output to Programmable Shader Pipeline Data Path 247. Gate Keeper 220 injects a quantity of fragments into Programmable Shader Pipeline Data Path 247 following the one or more codewords. Shader Core 230 and Combiner Unit 270 each receive the one or more codewords and use some or all of the one or more codewords to configure themselves to perform one or more operations using the fragments that follow the one or more codewords in Programmable Shader Pipeline Data Path 247. Thus, Programmable Shader 153 transmits control information and data on the same data path. Programmable Shader Pipeline Data Path 247 supports this transmission of control information and data on the same path by sequentially transmitting information stored in a register in a computation unit of Programmable Shader 153 to a register in another computation unit. For instance, information that was in a pipeline data path register in Shader Core 230 is transmitted to a pipeline data path register in Texture 240, and then to a pipeline data path register in Remap 250. After information has been transmitted to a pipeline data path register in a computation unit (e.g., Shader Core 230) the computation unit currently having the information determines if the information is either configuration information for the current computation unit or data used in performing an operation that the current computation unit is configured to perform. As discussed, the configuration information comprises one or more codewords. Since some of the one or more codewords may be intended for another computation unit, the current computation unit examines a predetermined location in its pipeline data path register for getting codewords intended for the current computation unit.

Thus, Programmable Shader 153 translates state-based control information and program instructions into a native control format comprising one or more codewords, determines which computation unit or units will be configured by the one or more codewords, and arranges the one or more codewords so that when the one or more codewords are stored in a pipeline data path register in a particular computation unit, the particular computation unit can retrieve the codeword or codewords intended to configure the particular computation unit.

Figure 3:
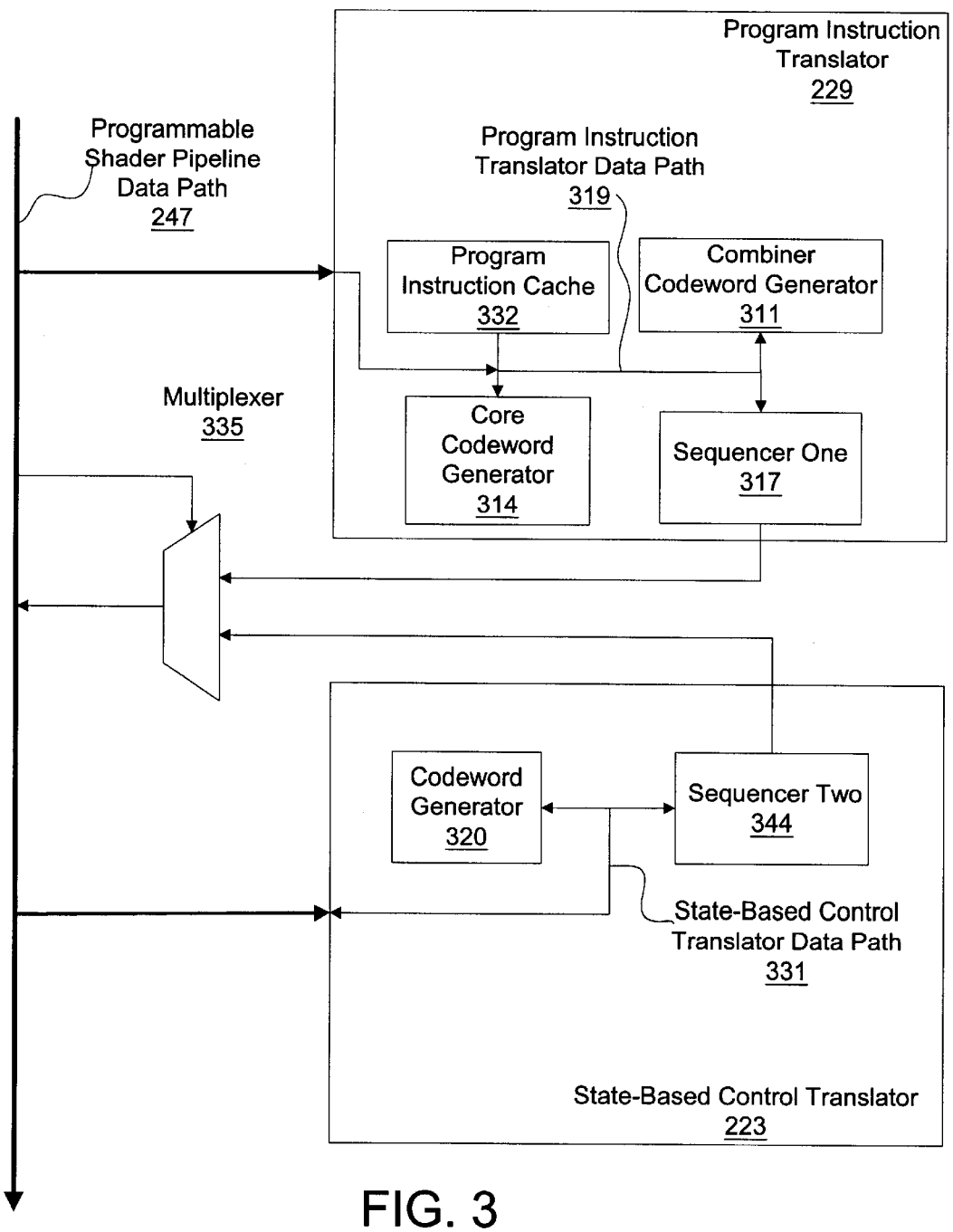
FIG. 3 illustrates a block diagram of a program instruction translator and a state-based control translator coupled to a programmable shader pipeline data path.

FIG. 3 illustrates an exemplary State-Based Control Translator 223 for translating state-based control information, and an exemplary Program Instruction Translator 229 for translating program instructions. Program Instruction Translator 229 comprises a Program Instruction Cache 332, a Combiner Codeword Generator 311, a Core Codeword Generator 314, and a Sequencer One 317. Program Instruction Cache 332 receives and caches program instructions from Programmable Shader Pipeline Data Path 247. Program Instruction Cache 332 responds to requests for program instructions from Sequencer One 317 by outputting one or more program instructions onto Program Instruction Translator Data Path 319.

Core Codeword Generator 314 and Combiner Codeword Generator 311 monitor Program Instruction Translator Data Path 319 for the program instructions output by Program Instruction Cache 332 that each is respectively responsible for translating. Core Codeword Generator 314 is responsible for translating the program instructions that execute only on Shader Core 230. These program instructions typically specify high precision operations (e.g., floating point calculations) using high precision operands. Combiner Codeword Generator 311 translates the program instructions that execute on either Shader Core 230 or Combiner Unit 270. These program instructions typically specify fixed-point calculations using lower precision operands. A detected program instruction is input and translated into one or more codewords by either Core Codeword Generator 314 or Combiner Codeword Generator 311. The one or more codewords are output to Program Instruction Translator Data Path 319 for receipt by Sequencer One 317.

Sequencer One 317 receives a data structure, herein referred to as a dataflow token, from Programmable Shader Pipeline Data Path 247 through Program Instruction Translator Data Path 319. The dataflow token can come from a plurality of sources. One source is Gate Keeper 220, which creates a dataflow token after having received new control information and fragment information to process using the new control information. Alternatively, a dataflow token can be returned by Combiner Unit 270 through Return Path 276 to Gate Keeper 220, if Programmable Shader 153 is operating in multi-pass mode.

The dataflow token has a plurality of fields, and computation units in the Programmable Shader 153 are each associated with one or more of the plurality of fields. For instance, Shader Core 230 and the Combiner Unit 270 are each associated with one or more of the plurality of fields. The fields to which a computation unit is associated, and the total number of fields in the dataflow token can be different in different embodiments. The one or more codewords are arranged so that a particular computation unit can retrieve codewords that are intended for configuring the particular computation unit as the codewords are transmitted through Programmable Shader Pipeline Data Path 247. During operation the dataflow token is stored in a pipeline data path register in a computation unit, and the computation unit retrieves codewords, and optionally other information from fields of the dataflow token to which it is associated.

The Sequencer One 317 determines in which of the plurality of fields to store each of the one or more codewords by determining which computation unit or units is to execute an operation specified by each of the one or more codewords. For instance, if the Shader Core 230 is to execute an operation specified by one of the one or more codewords, the Sequencer One 317 stores the one of the one or more codewords in a field of the dataflow token associated with the Shader Core 230. Thus, state-based control information or a program instruction can be translated into one or more codewords, and some of the one or more codewords can be executed on the Shader Core 230 while others can be executed on the Combiner Unit 270. As previously discussed, the computation units receive the one or more codewords stored in the dataflow token as the dataflow token travels through Programmable Shader 153, the dataflow token being stored in turn in a pipeline data path register in each computation unit. Each computation unit retrieves codewords and optionally other information from the field or fields of the dataflow token to which the computation unit is associated.

The Sequencer One 317 outputs the dataflow token to the Programmable Shader Pipeline Data Path 247 through a Multiplexer 335. Multiplexer 335 is configured by information generated by Gate Keeper 220 and received from Programmable Shader Pipeline Data Path 247. In addition, Multiplexer 335 is coupled to State-Based Control Translator 223, which receives state-based control information from Programmable Shader Pipeline Data Path 247. A Codeword Generator 320 directly receives the state-based control information, rather than using a cache for storing some or all of the state-based control information. However, a cache can be used in embodiments. The Codeword Generator 320 outputs one or more codewords derived from the state-based control information to State-Based Control Translator Data Path 331 for receipt by Sequencer Two 344. The Sequencer Two 344 inputs the one or more codewords and places the one or more codewords in a dataflow token; the dataflow token preferably has the same format as the dataflow token discussed in regard to Program Instruction Translator 229. The Sequencer Two 344 is configured to output the dataflow token to the Multiplexer 335. Multiplexer 335 connects either Program Instruction Translator 229 or State-Based Control Translator 223 to Programmable Shader Pipeline Data Path 247.

Although FIG. 3 illustrates Program Instruction Translator 229 and State-Based Control Translator 223 outputting a dataflow token to Multiplexer 335, this does not imply that Translators 229 and 223 must be physically close to each other. Rather, FIG. 3 illustrates that control information generated by Gate Keeper 220 and transmitted to Multiplexer 335 control whether and when a dataflow token from Translator 229 or 223 is admitted to Programmable Shader Pipeline Data Path 247. In an exemplary embodiment, State-Based Control Translator 223 is in Gate Keeper 220 and Program Instruction Translator 229 is in Remap 250. In another embodiment, Program Instruction Translator 229 is in Gate Keeper 220. In another embodiment, Program Instruction Translator 229 is in Remap 250, and a portion of Program Instruction Translator 229 is duplicated in Gate Keeper 220. In this embodiment, the portion of Program Instruction Translator 229 duplicated in Gate Keeper 220 comprises the Core Codeword Generator 314 and Sequencer One 317.

In another embodiment, Core Codeword Generator 314, and Combiner Codeword Generator 311 are combined into Codeword Generator 320 so that Codeword Generator 320 translates state-based control into codewords, and translates program instructions that can execute only on Shader Core 230 or on both Shader Core 230 and Combiner Unit 270. In this embodiment, Program Instruction Translator 229 and State-Based Control Translator 223 can be combined into one control translator. In this embodiment, one sequencer can perform the functions of Sequencer One 317 and Sequencer Two 344.

The above-described embodiments of the invention are readily extensible to the use of multiple dataflow tokens, as well as concurrent control of Programmable Shader 153 computation units by native control information generated from multiple control information types. As previously described, multiple control source indications can be transmitted to Programmable Shader 153. These indications either specify that Programmable Shader 153 is to be controlled by a certain type of control information, or that a particular computation unit of Programmable Shader 153 is to be controlled by a certain type of control information. The control source indications configure Sequencer One 317 and Sequencer Two 344 to store codewords only in fields of a dataflow token associated with computation units that are to be controlled by native control information generated from program instructions and state-based control information, respectively. As an example, if Shader Core 230 is controlled by program instructions and Combiner Unit 270 is controlled by state-based control information, a dataflow token is input into Program Instruction Translator 229, where Sequencer One 317 schedules one or more codewords derived from program instructions for execution on Shader Core 230 by storing the one or more codewords in a field associated with Shader Core 230. The dataflow token is output to Programmable Shader Pipeline Data Path 247 for receipt by State-Based Control Translator 223, where Sequencer Two 344 schedules one or more codewords derived from state-based control information for execution on Combiner Unit 270 and outputs the dataflow token to Programmable Shader Pipeline Data Path 247 for configuration of Shader Core 230 and Combiner Unit 270. Other embodiments use a separate dataflow token for each type of control information. In these embodiments, some fields of each dataflow token may be empty and can be ignored by computation units associated with those fields. An embodiment having a Codeword Generator 320 for translating both state-based control and program instructions is especially advantageous for generating native control information from multiple sources as the dataflow token need not be transmitted from Program Instruction Translator 229 to State-Based Control Translator 223.

The afore-mentioned embodiments are intended to be exemplary and not limiting either in the choice of placement or in the number of Program Instruction Translators 229 or State-Based Control Translators 223 in Programmable Shader 153.

Figure 4:
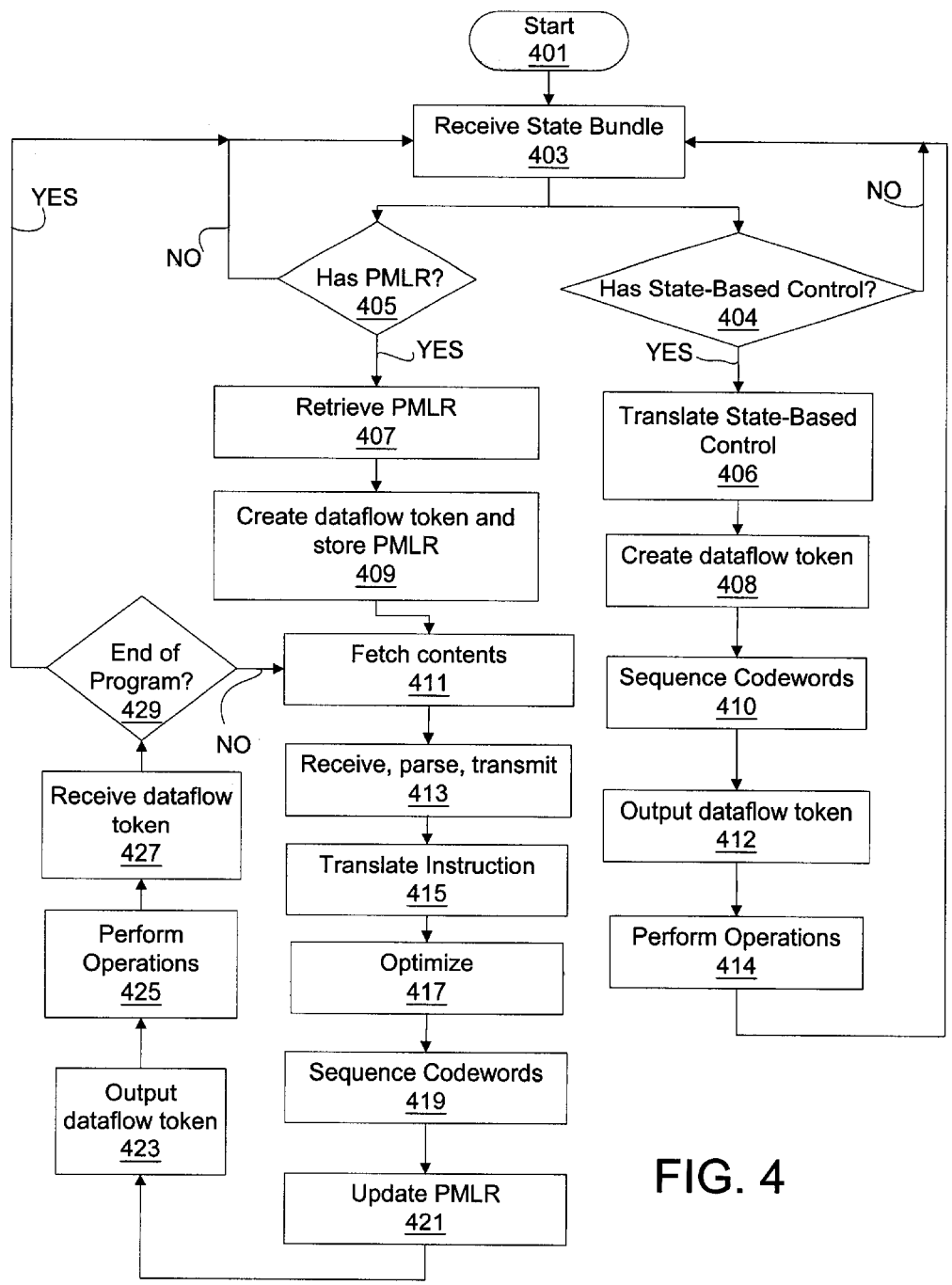
FIG. 4 illustrates an exemplary method for translating program instructions and state-based control information into native control information for control of a programmable shader.

FIG. 4 illustrates steps of an exemplary method for generating native control format information (e.g., one or more codewords) from either state-based control or from program instructions. In step 403, the Gate Keeper 220 receives a state bundle from Rasterizer 144. As previously described in regard to FIG. 1, a state bundle can contain control information (e.g., state-based control information or a PMLR), and other information. Gate Keeper 220 determines whether the received state bundle contains either a PMLR or state-based control information, in steps 405 and 404 respectively. In step 407, if the state bundle contains a PMLR, then the Gate Keeper 220 retrieves the PMLR from the state bundle. In step 409, Gate Keeper 220 creates a dataflow token, adds the PMLR to the dataflow token and transmits the dataflow token to Shader Core 230. Shader Core 230 issues a memory fetch request for the contents of the memory location referenced by the PMLR to Texture 240, which communicates with Memory Controller 156 in step 411. Shader Core 230 can be programmed to issue fetch requests for a pre-determined number of memory locations; each memory location determined, at least in part, by the PMLR. For instance, Shader Core 230 can issue fetch requests for the memory location referenced by the PMLR, and three memory locations following the memory location referenced by the PMLR. Also in step 411, the Shader Core 230 can issue other memory fetch requests for contents of memory locations expected to contain other information, such as textures. Shader Core 230 typically issues these other memory fetch requests after determining that a computation unit requires the other information to complete an operation specified by a codeword in the dataflow token.

Texture 240 receives the issued memory fetch requests and communicates the memory fetch requests to Memory Controller 156. Subsequently, Texture 240 receives the contents of the memory location(s) identified in the memory fetch request(s) issued by the Shader Core 230, parses the contents of the memory location(s) into one or more program instructions, and transmits the program instructions to Program Instruction Translator 229 in step 413. As described in regards to FIG. 3, either the Core Codeword Generator 314 or the Combiner Codeword Generator 311 translates each program instruction received from Texture 240 into one or more codewords in step 415. Some embodiments implement optimizations in step 417, such as combining codewords derived from two program instructions, as previously discussed. In step 419, Sequencer One 317 sequences the one or more codewords by placing each codeword in a field of the dataflow token. In step 421, Sequencer One 317 updates the PMLR to reflect the number of program instructions that were fetched in step 411 and adds the updated PMLR to the dataflow token. Thus, the PMLR tracks the location of the next program instruction to be fetched for translation into one or more codewords. The Sequencer One 317 outputs the dataflow token to Programmable Shader Pipeline Data Path 247 in step 423. In step 425, the computation units of Programmable Shader 153 perform operations specified by the codewords in the dataflow token. When Programmable Shader 153 is operating in multi-pass mode, Gate Keeper 220, in step 427, receives the dataflow token that was output to Programmable Shader Pipeline Data Path 247. In step 429, Gate Keeper 220 determines whether a last program instruction of the current shader program has been executed and, if so, returns to step 403. Otherwise, Gate Keeper 220 transmits the dataflow token to Shader Core 230, which generates a memory fetch request for the contents of the memory location referenced by the updated PMLR in step 411, as previously described. The remaining steps 413, 415, 417, 419, 421, 423, 425, 427 and 429 repeat until all the program instructions of a shader program have been fetched.

If in step 404, the Gate Keeper 220 determines that the state bundle contains state-based control information, the Gate Keeper 220 transmits the state-based control information to State-Based Control Translator 223, which translates the state-based control information into one or more codewords in step 406. Gate Keeper 220 creates a dataflow token in step 408. Sequencer Two 344 sequences the one or more codewords by placing each of the one or more codewords in a field of the dataflow token in step 410. Sequencer Two 344 outputs the dataflow token to the Multiplexer 335 for output to the Programmable Shader Pipeline Data Path 247 in step 412. In step 414, the computation units of Programmable Shader 153 perform operations specified by the codewords in the dataflow token.

As can be discerned from the steps of FIG. 4, Programmable Shader 153 is not constrained to operating solely under the control of program instructions or state-based control information. In embodiments, multiple separate sets of data can be processed by computation units of Programmable Shader 153 controlled by native control information derived from different control sources. In these embodiments, dataflow tokens output in steps 423 and 412 advantageously serve to signal a computation unit to reconfigure itself with codewords from the dataflow token and process data following the dataflow token using that configuration until another dataflow token is received.

In an embodiment, the Program Instruction Translator 229 described above is located in Remap 250. In this embodiment, if the Programmable Shader 153 is controlled by program instructions, a computation unit of the Programmable Shader 153 (e.g., Shader Core 230) does not start to execute operations on data until the computation unit receives the dataflow token, which is output in step 423, retrieves the codewords from fields in the dataflow token associated with the computation unit, and uses the codewords to configure itself to execute the operations specified by the retrieved codewords. In particular, Shader Core 230 does not execute a codeword until the second pass of the dataflow token through Programmable Shader Pipeline Data Path 247 because the first time through, the dataflow token contains no codewords. Thus, there is a delay (latency) between a time when Host Computer 111 transmits a PMLR to Graphics Subsystem 126 for receipt by Programmable Shader 153 and a time when a computation unit in Programmable Shader 153 begins to execute codewords. To reduce this latency, a unit in Graphics Subsystem 126 located before Programmable Shader 153 in the Graphics Processing Pipeline 132 can implement the method of FIG. 5, and an embodiment of Gate Keeper 220 can implement steps illustrated in FIG. 6.

Figure 5:
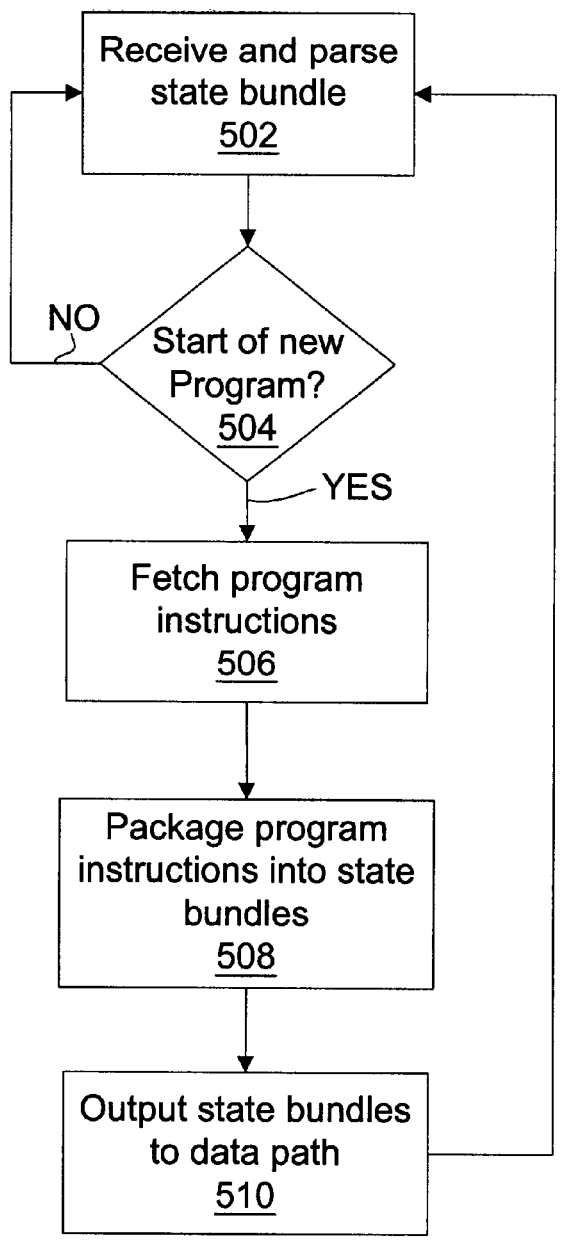
FIG. 5 illustrates exemplary steps taken by a controller to pre-fetch program instructions for execution by a programmable shader.

FIG. 5 illustrates exemplary steps taken by Controller 131 (FIG. 1) located in Graphics Interface 123 of Graphics Subsystem 126 to pre-fetch one or more program instructions of a new shader program and transmit the one or more program instructions to Programmable Shader 153. One skilled in the art would recognize that another unit of Graphics Subsystem 126 can perform the method steps described herein.

In step 502, Graphics Interface 123 receives a state bundle, which is parsed by Controller 131. As noted in regard to FIG. 1, state bundles can contain a PMLR, state-based control information, and other information. Host Computer 111 transmits a state bundle containing a PMLR to Graphics Interface 123 when an application or a driver for an application wants to execute a new shader program. Therefore, in step 504, Controller 131 determines whether a new shader program is to be executed by determining whether a state bundle received from Host Computer 111 contains a PMLR. If the state bundle contains a PMLR, Controller 131 typically fetches a pre-determined number of program instructions from one or more locations in Local Memory 138 or Host Memory 112 determined in part by the memory location identified in the PMLR. Controller 131 is optionally programmed with information indicating how many program instructions are stored in a single memory location. For instance, in an embodiment a memory location can contain two program instructions. Thus, if Controller 131 is programmed to fetch four program instructions, then in step 506 Controller 131 fetches the first two program instructions from the memory location identified in the PMLR and the next two program instructions from the memory location following the memory location identified in the PMLR. In step 508, Controller 131 stores the fetched program instructions in one or more state bundles. To aid in program instruction reassembly by Gate Keeper 220, Controller 131 adds a reassembly header indicating what portion of the program instructions each state bundle contains. Here, storing refers to placing information into the data structure of the state bundle (as previously described in regards to Graphics Processing Pipeline 132) so that information stored in the state bundle is transferred together through Graphics Processing Pipeline 132. To maintain flexibility in defining program instructions and designing the hardware, including Graphics Processing Pipeline Data Path 133, a program instruction can be split amongst a plurality of state bundles (e.g., a first portion of the program instruction is stored in a first state bundle and a second portion of the program instruction is stored in a second state bundle). Alternatively, a state bundle can contain an entire program instruction or more than one program instruction. In step 510, Controller 131 outputs the state bundles of step 508 for transmission to Programmable Shader 153. Typically, Controller 131 outputs the state bundles containing program instruction information directly after the state bundle containing the PMLR (as discussed above) so that the program instructions immediately follow the PMLR in Graphics Processing Pipeline 132. The nature and number of steps in FIG. 5 can vary depending on the architecture of Programmable Shader 153 and Graphics Subsystem 126.

Since in typical operation, a PMLR indicates the start of a new shader program comprising one or more program instructions for execution on Programmable Shader 153, it is preferable that Controller 131 perform the steps described above while Programmable Shader 153 is executing program instructions from a prior shader program so that a new shader program can begin to execute with minimal delay.

Figure 6:
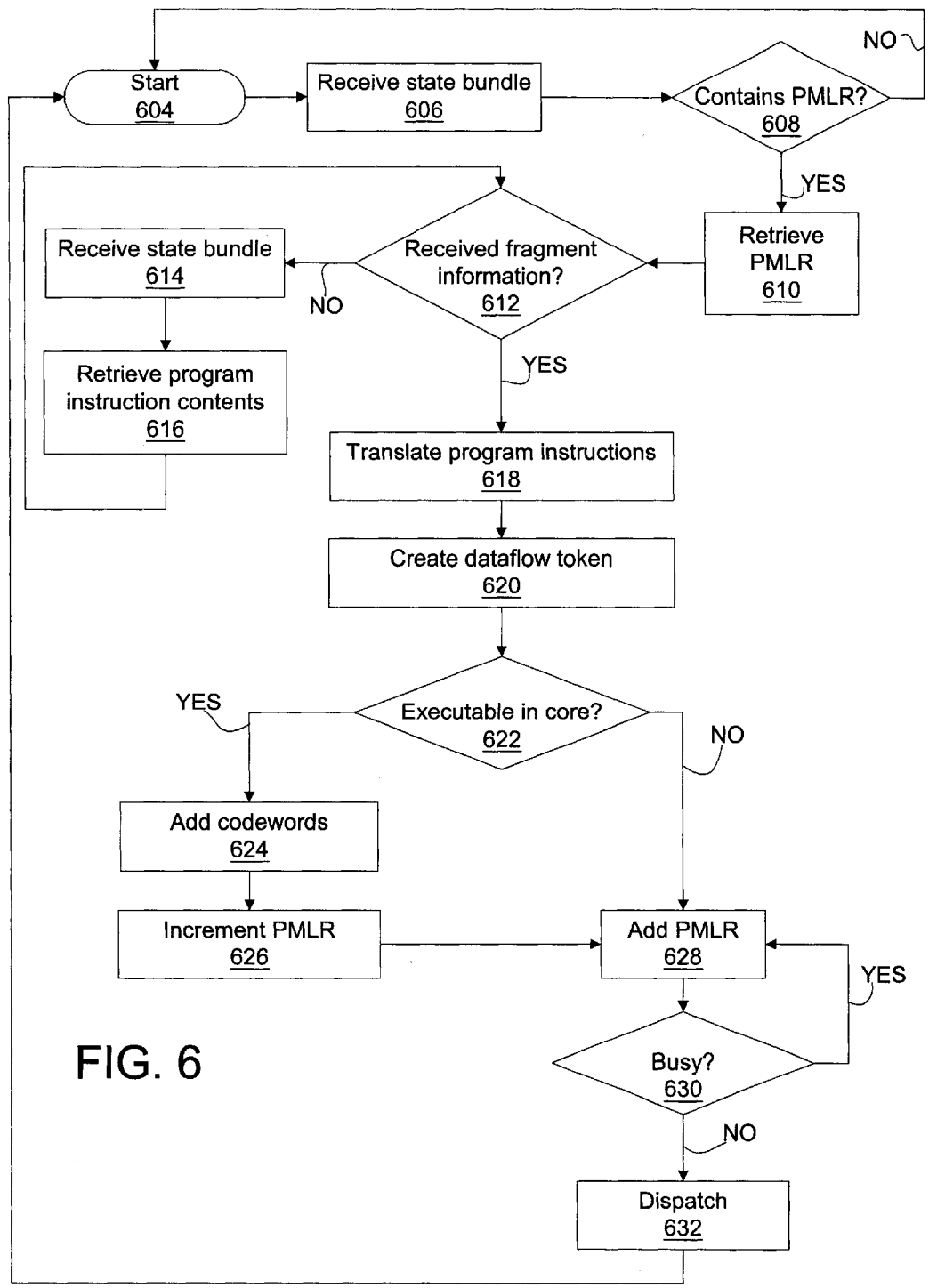
FIG. 6 illustrates exemplary steps for translating pre-fetched program instructions and generating requests for fetching further program instructions.

FIG. 6 illustrates the steps taken by Gate Keeper 220 upon receiving a state bundle containing a PMLR. These steps describe the basic process that Gate Keeper 220 performs when beginning to execute a new shader program whether or not Controller 131 pre-fetches program instructions as described in FIG. 5. In step 606, Gate Keeper 220 receives a state bundle through Graphics Processing Pipeline Data Path 133, and determines whether the state bundle contains a PMLR in step 608. If the state bundle does not contain a PMLR, the process returns to step 604, otherwise Gate Keeper 220 retrieves the PMLR from the state bundle in step 610. In step 612, Gate Keeper 220 determines whether it has received fragment information. In this embodiment, Gate Keeper 220 receives all state bundles having program instruction content before any fragment information is received, thus receiving fragment information signals Gate Keeper 220 to proceed with program instruction translation in step 618. If Gate Keeper 220 has not received fragment information, Gate Keeper 220 receives a state bundle with program instruction content in step 614, and in step 616 retrieves the program instruction content, and stores the content in a memory location determined by the reassembly header previously discussed. Thus, the step of storing in this embodiment also reassembles the program instructions into a format for translation. After retrieving and storing in step 616, Gate Keeper 220 returns to step 612, where it again determines whether it has received fragment information. If Gate Keeper 220 has received fragment information, it translates, in step 618, the stored program instructions into one or more codewords and creates a dataflow token in step 620. In step 622, Gate Keeper 220 determines whether the codewords are executable on Shader Core 230. If either a first reassembled program instruction, or the first and a second reassembled program instruction are executable on Shader Core 230, Gate Keeper 220 adds the codewords representing each program instruction executable on Shader Core 230 to the dataflow token in step 624, and increments the PMLR. Gate Keeper 220 adds the incremented PMLR to the dataflow token in step 626. If, in step 622, the first program instruction is not executable on Shader Core 230, Gate Keeper 220 adds only the PMLR to the dataflow token in step 628. In step 630, Gate Keeper 220 waits until Programmable Shader 153 is not busy, and dispatches the dataflow token in step 632.

For performing the program instruction translation of step 618 and the adding of the one or more codewords to a dataflow token in step 624, the Gate Keeper 220 can contain a version of Program Instruction Translator 229. Since, in this embodiment, Gate Keeper 220 is only concerned with determining whether a reassembled program instruction can be executed in Shader Core 230 (see step 622), the version of Program Instruction Translator 229 contained in Gate Keeper 220 need not contain Combiner Codeword Generator 311 or Program Instruction Cache 332. This smaller version of Program Instruction Translator 229 is referred to herein as a Mini Program Instruction Translator. In embodiments where Gate Keeper 220 contains a Mini Program Instruction Translator, Programmable Shader 153 contains a Combiner Codeword Generator 311 elsewhere. For instance, Program Instruction Translator 229 can be located in Remap 250, Texture 240, or in Shader Back End 260. In embodiments wherein Controller 131 does not pre-fetch instructions, Gate Keeper 220 need not have either Program Instruction Translator 229 or a Mini Program Instruction Translator if Program Instruction Translator 229 is located elsewhere in Programmable Shader 153.

The above-described method and associated apparatus advantageously allow a shader program to begin execution on Programmable Shader 153 more quickly, and some shader programs having only a few instructions may be executable entirely on the Shader Core 230 in a single pass.

Figure 7:
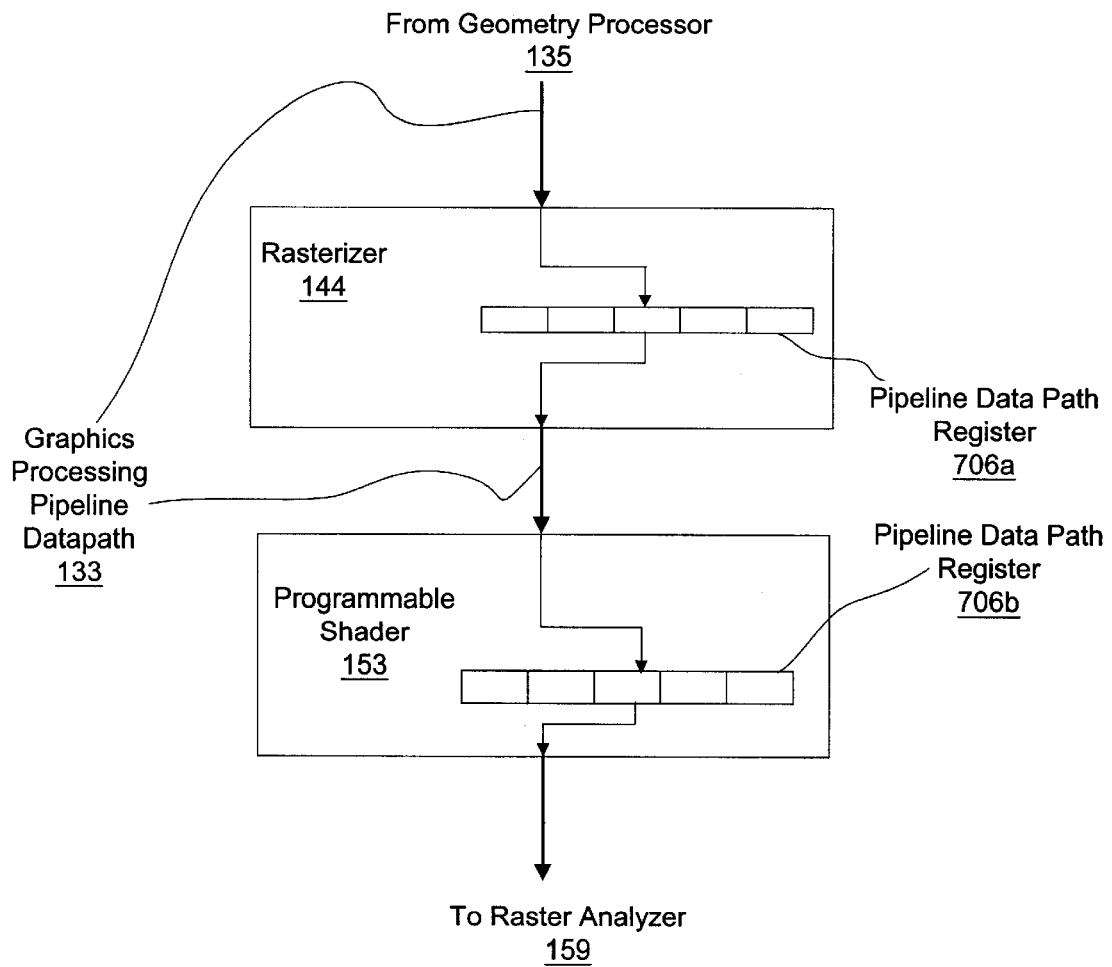
FIG. 7 illustrates Pipeline Data Path Registers in a graphics pipeline data path.

FIG. 7 illustrates the use of Pipeline Data Path Registers (e.g., Pipeline Data Path Registers 706a and 706b) in a portion of Graphics Processing Pipeline 132. As previously described in relation to FIG. 2, each unit of Graphics Processing Pipeline 132 contains at least one Pipeline Data Path Register for receiving information from Graphics Processing Pipeline Data Path 133. Upon receiving information, each unit's Pipeline Data Path Register temporarily stores the received information while the unit accesses the information. For instance, if the information is a dataflow token having one or more codewords, the unit can retrieve a codeword from the dataflow token. As illustrated in FIG. 7, the information stored in Pipeline Data Path Register 706a is transmitted to Pipeline Data Path Register 706b. Information stored in a Pipeline Data Path Register in one unit of Graphics Subsystem 126 is transmitted to a Pipeline Data Path Register in the unit of Graphics Subsystem 126 that follows the one unit in the Graphics Processing Pipeline Data Path 133.

The information stored by each Pipeline Data Path Register 706 includes state bundles, and data for processing by units of Graphics Subsystem 126 (e.g., Programmable Shader 153). As previously discussed, a state bundle can contain, in addition to other information, a PMLR or state-based control information. Thus, the content stored in Pipeline Data Path Registers, such as Pipeline Data Path Registers 706a and 706b, depends on the type of control information generated by an application running on Host Computer 111, and in an embodiment is either a PMLR or state-based control information. When not storing control information, a Pipeline Data Path Register can store data for processing.

By using a single Pipeline Data Path Register, such as Pipeline Data Path Register 706a, for storing and transmitting both types of control information and data for processing, Graphics Subsystem 126 efficiently uses data path resources, and advantageously enables each unit of Graphics Subsystem 126 to transmit and receive information when ready.

A number of different embodiments are specifically illustrated and/or described herein. However, it will be appreciated that modifications and variations are covered by the above teachings and within the scope of the appended claims without departing from the spirit and intended scope thereof.

We claim:

1. A programmable shader for a graphics subsystem comprising:
   a state-based control translator coupled to a data path and configured to
      translate state-based control information into native control information, and
      output the native control information to the data path;
   a program instruction translator coupled to the data path and configured to
      translate a program instruction into native control information, and
      output the native control information to the data path; and
   a computation unit coupled to the data path to receive the native control information for configuration of the computation unit.

2. The programmable shader of claim 1, wherein the native control information comprises one or more codewords.

3. The programmable shader of claim 1, wherein the state-based control information is DirectX 8 control information.

4. The programmable shader of claim 1, wherein the program instruction is a DirectX 9 shader program instruction.

5. The programmable shader of claim 1, further comprising a pipeline interface coupled to the data path and configured to receive from a unit of the graphics subsystem a program memory location reference.

6. The programmable shader of claim 5, wherein the computation unit is configured to issue a memory fetch request for the contents of a memory location referenced by the program memory location reference.

7. The programmable shader of claim 5, further comprising:
   an other computation unit coupled to the data path and configurable by native control information.

8. The programmable shader of claim 7, further comprising:
   an other program instruction translator coupled to the data path, and configured to
      translate a program instruction into native control information and
      output the native control information to the data path.

9. The programmable shader of claim 5, wherein the pipeline interface is further configured to receive state-based control information from a unit of the graphics subsystem.

10. The programmable shader of claim 5, wherein the pipeline interface is further configured to receive data for processing from a unit of the graphics subsystem.

11. The programmable shader of claim 5, wherein the pipeline interface is further configured to receive a control source indication specifying whether the programmable shader is to be controlled by state-based control information or program instructions.

12. The programmable shader of claim 11, further comprising:
   a memory register coupled to the data path for storing state-based control information, if the control source indication indicates that the programmable shader is to be controlled by state-based control information.

13. The programmable shader of claim 11, further comprising:
   a memory register coupled to the data path for storing a program memory location reference, if the control source indication indicates that the programmable shader is to be controlled by program instructions.

14. A computing system for processing and displaying graphical information, comprising:
   a host computer comprising
      a host memory for storing a first program and a second program, the first program executable by the host computer to create state-based control information, and the second program executable by the host computer to create a program memory location reference, and a system interface;

a graphics subsystem for processing the graphical information comprising a graphics interface coupled to the system interface for receiving the state-based control information and the program memory location reference, a local memory coupled to the graphics interface, and a programmable shader coupled to the graphics interface comprising a state-based control translator coupled to a data path and configured to translate state-based control information into native control information, and output the native control information to the data path;

a program instruction translator coupled to the data path and configured to retrieve a program instruction from a memory using the program memory location reference, translate the program instruction into native control information, and output the native control information to the data path; and a computation unit coupled to the data path to receive the native control information; and a display coupled to the graphics subsystem for displaying the processed graphical information.

15. The computing system of claim 14, wherein the memory from which the program instruction translator is configured to retrieve the program instruction is the local memory.

16. The computing system of claim 14, wherein the memory from which the program instruction translator is configured to retrieve the program instruction is the host memory.

17. The computing system of claim 14, wherein the host memory is configured to directly interface with the system interface.

18. The computing system of claim 14, wherein the host computer further comprises a host processor configured to interface with the host memory.

19. A graphics subsystem for processing graphical information comprising:

an interface coupled to receive, from a host computer, state-based control information and a program memory location reference, a controller coupled to the interface, and configured to detect the program memory location reference received by the interface, and fetch a program instruction referenced by the detected program memory location reference;

a programmable shader for processing the graphical information, the programmable shader coupled to the interface and comprising a state-based control translator coupled to a data path, and configured to translate the state-based control information into native control information and output the native control information to the data path, a program instruction translator coupled to the data path, and configured to translate the fetched program instruction into native control information and output the native control information to the data path, and a computation unit coupled to the data path to receive the native control information.

20. The graphics processor of claim 19, wherein the controller is further configured to store a first portion of the program instruction in a first data structure and a second portion of the program instruction in a second data structure.

21. The graphics processor of claim 20, wherein the programmable shader is further configured to retrieve the first portion of the program instruction from the first data structure and the second portion of the program instruction from the second data structure.

22. The graphics processor of claim 21, wherein the programmable shader is further configured to store the first portion of the program instruction in a first memory location and the second portion of the program instruction in a second memory location.

23. A programmable shader for a graphics subsystem comprising:

a state-based control translator coupled to a data path and configured to translate state-based control information into first native control information, and output the first native control information to the data path;

a program instruction translator coupled to the data path and configured to translate a program instruction into second native control information, and output the second native control information to the data path;

a first computation unit coupled to the data path to receive the first native control information; and a second computation unit coupled to the data path to receive the second native control information.

24. A method for generating native control information for controlling a programmable shader, comprising the steps of:

determining whether the programmable shader is to be controlled by state-based control information or program instructions;

receiving in a graphics subsystem state-based control information and translating the state-based control information into native control information, if the programmable shader is to be controlled by state-based control information; and receiving in a graphics subsystem a program memory location reference, fetching one or more program instructions from a memory location referenced by the program memory location reference and translating the one or more program instructions into native control information, if the programmable shader is to be controlled by program instructions.

25. The method for generating native control information of claim 24, wherein the step of receiving state-based control information further includes storing the state-based control information in a pipeline data path register.

26. The method for generating native control information of claim 24, wherein the step of receiving a program memory location reference further includes storing the program memory location reference in a pipeline data path register.

27. The method for generating native control information of claim 26, wherein the native control information comprises one or more codewords, and translating the one or more program instructions into native control information further comprises:

matching one of the one or more codewords with an other of the one or more codewords; and combining the one of the one or more codewords and the other of the one or more codewords into a single codeword.

28. A method for transferring control information to a programmable shader, comprising the steps of:
- receiving a control source indication specifying that the programmable shader is to be controlled by program instructions, wherein the control source indication can specify either that the programmable shader is to be controlled by state-based control information or program instructions;
- determining a memory address where a program instruction of the shader program is stored;
- retrieving contents of the memory address;
- identifying one or more program instructions in the retrieved contents; and
- outputting for receipt by the programmable shader the one or more program instructions.

29. The method of claim 28, further comprising the steps of:
- inputting the one or more program instructions into the programmable shader;
- translating the one or more program instructions into one or more codewords; and
- scheduling at least one of the one or more codewords for execution in the programmable shader.

30. The method of claim 29, further comprising the step of storing the one or more program instructions in one or more state bundles.

31. The method of claim 30, further comprising the step of storing the one or more state bundles in a pipeline data path register coupled to the programmable shader.

32. A method for generating native control information for controlling computation units of a programmable shader, comprising the steps of:
- receiving in a graphics subsystem state-based control information for control of a first computation unit;
- translating the state-based control information into native control information;
- receiving in the graphics subsystem a program memory location reference for identifying a memory location storing a program instruction for control of a second computation unit;
- fetching the program instruction; and
- translating the program instruction into native control information.

33. A control translator for use in a programmable shader having a plurality of computation units for processing graphical information, the control translator comprising:
- a codeword generator configured to
  - input control information, wherein the control information is either state-based control information or a program instruction;
  - translate the control information into native control information consisting of one or more codewords, each codeword specifying an operational configuration for one of the plurality of computation units; and
- a sequencer configured to
  - input the native control information, and
  - arrange the native control information in a predetermined format compatible with at least one of the plurality of computation units.

34. A machine readable medium having embodied thereon a program, the program being executable by a machine to perform a method for generating native control information for a programmable shader, the method comprising the steps of:
- determining whether an application uses state-based control information or program instructions for describing operations that the programmable shader is to perform on data;
- receiving state-based control information and translating the state-based control information into native control information, if the application uses state-based control information; and
- receiving one or more program instructions and translating the one or more program instructions into native control information, if the application uses program instructions.

35. A graphics subsystem comprising:
- a means for determining a final pixel color, the means controllable by native control information;
- a means for translating state-based control information into the native control information; and
- a means for translating program instructions into the native control information.

36. The graphics subsystem of claim 35, wherein the graphics subsystem further comprises:
- a means for storing program instructions;
- a means for receiving, from a host computer, a program memory location reference;
- a means for fetching program instructions; and
- a means for transmitting fetched program instructions to the means for translating program instructions into the native control information.

37. The graphics subsystem of claim 36, wherein the graphics subsystem further comprises:
- a means for receiving, from the host computer, state-based control information; and
- a means for transmitting the state-based control information to the means for translating state-based control information into the native control information.

* * * * *